United States Patent
Kim et al.

(10) Patent No.: US 9,481,786 B2
(45) Date of Patent: Nov. 1, 2016

(54) THERMOPLASTIC RUBBER COMPOSITION AND MOLDED PRODUCT USING SAME

(71) Applicant: SAMSUNG SDI CO., LTD., Yongin-si (KR)

(72) Inventors: Jung Wook Kim, Uiwang-si (KR); Chan Gyun Shin, Uiwang-si (KR); Jong Cheol Lim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/782,922

(22) PCT Filed: Jun. 26, 2013

(86) PCT No.: PCT/KR2013/005652
§ 371 (c)(1),
(2) Date: Oct. 7, 2015

(87) PCT Pub. No.: WO2014/168290
PCT Pub. Date: Oct. 16, 2014

(65) Prior Publication Data
US 2016/0046802 A1 Feb. 18, 2016

(30) Foreign Application Priority Data

Apr. 12, 2013 (KR) .................. 10-2013-0040355

(51) Int. Cl.
| | |
|---|---|
| *C08J 9/228* | (2006.01) |
| *C08L 53/02* | (2006.01) |
| *C08K 3/00* | (2006.01) |
| *C08K 5/01* | (2006.01) |
| *C08J 5/00* | (2006.01) |

(52) U.S. Cl.
CPC *C08L 53/02* (2013.01); *C08J 5/00* (2013.01); *C08K 3/00* (2013.01); *C08K 5/01* (2013.01); *C08L 53/025* (2013.01); *C08J 2347/00* (2013.01); *C08J 2423/08* (2013.01); *C08J 2423/12* (2013.01); *C08J 2433/10* (2013.01); *C08L 2205/03* (2013.01); *C08L 2207/04* (2013.01)

(58) Field of Classification Search
CPC ......................................... C08J 9/228
See application file for complete search history.

(56) References Cited

U.S. PATENT DOCUMENTS

| | | | |
|---|---|---|---|
| 9,096,748 B2 | 8/2015 | Eguchi et al. | |
| 2007/0129454 A1 | 6/2007 | Su et al. | |
| 2010/0099784 A1* | 4/2010 | Su ........................ | C08J 9/0061 521/95 |

FOREIGN PATENT DOCUMENTS

| | | |
|---|---|---|
| KR | 10-0780229 B1 | 11/2007 |
| KR | 10-0799262 B1 | 1/2008 |
| KR | 10-2013-0020898 A | 3/2013 |
| WO | 2014/168290 A1 | 10/2014 |

OTHER PUBLICATIONS

International Search Report in counterpart International Application No. PCT/KR2013/005652 dated Oct. 24, 2013, pp. 1-4.

\* cited by examiner

*Primary Examiner* — Robert Harlan
(74) *Attorney, Agent, or Firm* — Additon, Higgins & Pendleton, P.A.

(57) ABSTRACT

Disclosed is a thermoplastic rubber composition comprising, based on 100 parts by weight of a block terpolymer (A) of an aromatic vinyl compound and an alkene compound, 50 to 100 parts by weight of a paraffin oil (B), 30 to 70 parts by weight of an inorganic additive (C), 5 to 30 parts by weight of a polyolefin-based resin (D), and 30 to 70 parts by weight of an acryl-based resin (E). The hardness of the thermoplastic rubber composition may be freely adjusted and the thermoplastic rubber composition has a bonding strength of 2 to 4 N/mm as measured using a UTM according to a KS M 6518 peeling test method. Accordingly, bonding strength thereof to a thermoplastic resin is increased even without addition of an adhesive.

16 Claims, 1 Drawing Sheet

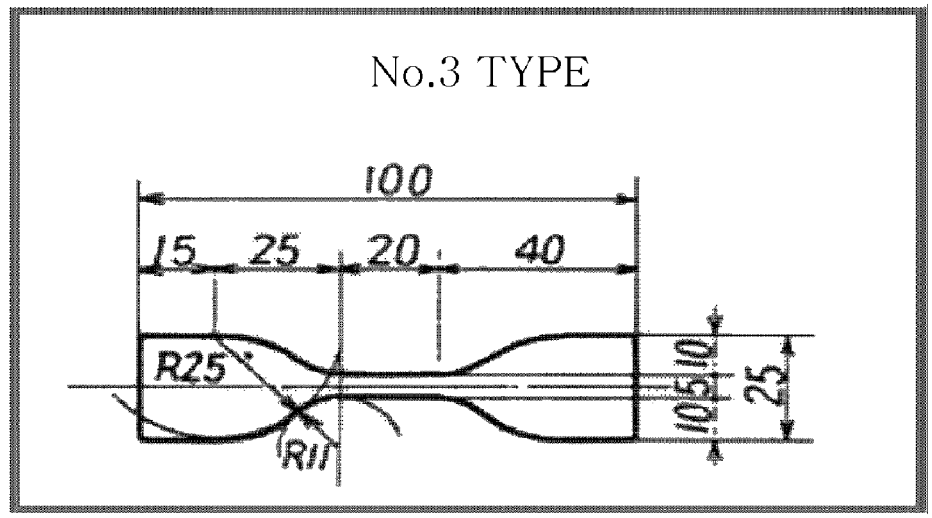

THERMOPLASTIC RUBBER COMPOSITION AND MOLDED PRODUCT USING SAME

CROSS-REFERENCE TO RELATED APPLICATIONS

This application claims priority to and the benefit of International Application No. PCT/KR2013/005652, filed Jun. 26, 2013, which published as WO 2014/168290 on Oct. 16, 2014, and Korean Patent Application No. 10-2013-0040355, filed in the Korean Intellectual Property Office on Apr. 12, 2013, the entire disclosure of each of which is incorporated herein by reference.

TECHNICAL FIELD

The present invention relates to a thermoplastic rubber composition. More particularly, the present invention relates to a thermoplastic rubber composition which may strongly bond to a polar resin without application of an adhesive. In addition, the present invention comprises a molded product manufactured from a composite thermoplastic resin comprising the thermoplastic rubber composition according to the present invention and a thermoplastic resin.

BACKGROUND ART

In order to improve impact mitigation effects, anti-sliding effects or texture of molded products, thermoplastic rubber compositions are laminated on thermoplastic resin molded products.

Conventionally, styrene-based thermoplastic rubbers or olefin-based rubbers having superior flexibility were laminated on thermoplastic resin molded products.

Additionally, a thermoplastic rubber composition may be laminated on or bonded to a thermoplastic resin to manufacture molded products. Examples of such a method include a coextrusion molding method, a two-color molding method, an insert injection molding method, a double injection molding method, etc. The coextrusion molding method is a molding method wherein two materials, i.e., a thermoplastic resin and a thermoplastic rubber composition are separately extruded in two extruders and are joined in a die so that the two materials are molded through heat-welding. The two-color molding method is a molding method wherein two-layer molded products are molded by heat-welding two materials in a mold using an injection molding machine equipped with two injection buckets. The insert injection molding method is a molding method wherein two-layer molded products are manufactured by injecting a thermoplastic rubber composition into a mold into which a thermoplastic resin molded product molded using an injection machine is inserted and heat-welding the same. The double injection molding method is a molding method wherein molded products are manufactured by sequentially injection-molding two resin types in a mold.

However, when such methods are used, a bonding property to a polyolefin-based resin is good as a styrene-based thermoplastic rubber does not have a polar functional group, but a bonding property to polycarbonate resin is very poor. Accordingly, when a complex is formed using the styrene-based thermoplastic rubber and a thermoplastic resin including a polar functional group such as the polycarbonate resin, unevenness may be formed in the complex or properties of a thermoplastic rubber may be deteriorated.

Conventionally, a styrene-based thermoplastic rubber composition was laminated on a polycarbonate resin using an adhesive. However, in this case, preparation process steps are added and preparation costs increase.

Accordingly, development of products is being tried using an alloy of a thermoplastic rubber and a resin, but, in this case, thermal characteristics are not satisfied at high temperature and softness of a product surface is deteriorated.

In order to address such problems, a technology of enhancing bonding between a polycarbonate resin or a polyacrylate resin and a styrene-based thermoplastic rubber without application of an adhesive using poly(styrene-b-ethylene-co-butylene-b-styrene)-g-(maleic anhydride) (SEBS-g-MA) as a compatibilizer, in which a styrene-ethylenebutylene-styrene block copolymer and a maleic anhydride, are graft-copolymerized, was developed. However, in this case, it is not easy to control hardness and a functional group of a maleic anhydride of SEBS-g-MA may cause side reaction depending upon processing conditions.

In addition, the hardness of the thermoplastic rubber composition should be controlled depending upon required characteristics of a final product. However, in conventional thermoplastic rubber compositions, it is not easy to control hardness thereof.

Accordingly, the present inventors developed a thermoplastic rubber composition wherein, when a thermoplastic resin and a thermoplastic rubber composition are bonded, a resin ingredient and a rubber ingredient may be directly bonded through strong adhesive force thereof without application of an adhesive, and, furthermore, hardness thereof may be easily controlled.

DISCLOSURE

Technical Problem

Therefore, the present invention has been made in view of the above problems, and it is an object of the present invention to provide a thermoplastic rubber composition having superior bonding properties to a thermoplastic resin.

It is another object of the present invention to provide a thermoplastic rubber composition, hardness of which may be easily controlled.

It is yet another object of the present invention to provide a thermoplastic rubber composition which has superior bonding properties to a thermoplastic resin and hardness of which may be easily controlled, and a composite thermoplastic resin-molded product wherein a thermoplastic rubber is laminated on the thermoplastic resin.

The above and other objects can be accomplished by the present invention described below.

TECHNICAL SOLUTION

In accordance with an aspect of the present invention, the above and other objects can be accomplished by the provision of a thermoplastic rubber composition comprising, based on 100 parts by weight of a block terpolymer (A) of an aromatic vinyl compound and an alkene compound, 50 to 100 parts by weight of a paraffin oil (B); 30 to 70 parts by weight of an inorganic additive (C); 5 to 30 parts by weight of a polyolefin-based resin (D); and 30 to 70 parts by weight of an acryl-based resin (E).

The terpolymer (A) may be an A-B-A' type, wherein A and A' blocks may be hard segments and B block may be a soft segment, wherein the hard segments may be comprised in an amount of 20 to 35% by weight and the soft segment may be comprised in an amount of 65 to 80% by weight.

Particularly, A and A' blocks may be aromatic vinyl-based polymers and B block may be a conjugated diene-based polymer.

As the terpolymer (A), a styrene-ethylene-butadiene-styrene (SEBS) block copolymer, a styrene-ethylene-propylene-styrene (SEPS) block copolymer, a styrene-isoprene-styrene (SIS) block copolymer, a styrene-ethylene-isoprene-styrene (SEIS) block copolymer, a styrene-ethyleneethylene-propylene-styrene (SEEPS) block copolymer or a mixture of two or more thereof may be used. The terpolymer (A) may have a weight-average molecular weight of 140,000 to 180,000 g/mol.

The paraffin oil (B) may have a kinematic viscosity of 95 to 215 cSt (at 40° C.), and a ratio of the terpolymer (A) to the paraffin oil (B) may be 2:1 to 2:2.

As the inorganic additive (C), calcium carbonate, talc, clay, silica, mica, titanium dioxide, carbon black, graphite, wollastonite, nano-silver, having a particle size of 0.01 to 5 μm, or a mixture thereof may be used.

As the polyolefin-based resin (D), a polypropylene resin or a polypropylene-ethylene copolymer resin, which has a melt index of 20 to 40 g/10 min under conditions of 230° C. and 2.16 kg, may be used.

As the acryl-based resin (E), methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, allyl acrylate, ethylene methyl acrylate or mixtures thereof may be used. Particularly, ethylene methyl acrylate may be used.

The thermoplastic rubber composition according to the present invention may further comprise an antimicrobial agent, a thermal stabilizer, an antioxidant, a releasing agent, a light stabilizer, a surfactant, a coupling agent, a plasticizer, an admixture, a coloring agent, a stabilizer, a lubricant, an antistatic agent, a coloring agent, a flame retardant, an anti-weathering agent, a UV absorbent, a sunscreen, a filler, a nucleating agent, an adhesion aid, an adhesive and mixtures thereof.

In accordance with another aspect of the present invention, provided is a molded product manufactured from the thermoplastic rubber composition according to the present invention.

In accordance with another aspect of the present invention, provided is a composite thermoplastic resin wherein the thermoplastic rubber composition is laminated or coated on a thermoplastic resin. Here, as the thermoplastic resin, a styrene-based resin, a polycarbonate-based resin, a polyolefin-based resin, or the like may be used. In addition, a molded product is manufactured from the composite thermoplastic resin.

Hereinafter, the present invention is described in more detail below.

ADVANTAGEOUS EFFECTS

As described above, the present invention provides a thermoplastic rubber composition, hardness of which may easily controlled and which has superior bonding properties to a thermoplastic resin.

BEST MODE

The present invention relates to a thermoplastic rubber composition, more particularly, to a thermoplastic rubber composition which may strongly bond to a polar resin without application of an adhesive.

Thermoplastic Rubber Composition

The thermoplastic rubber composition according to the present invention comprises a block terpolymer (A) of an aromatic vinyl compound and an alkene compound, a paraffin oil (B), an inorganic additive (C), a polyolefin-based resin (D) and an acryl-based resin (E).

The thermoplastic rubber composition according to the present invention may comprise, based on 100 parts by weight of the block terpolymer (A) of the aromatic vinyl compound and the alkene compound, 50 to 100 parts by weight of the paraffin oil (B), 30 to 70 parts by weight of the inorganic additive (C), 5 to 30 parts by weight of the polyolefin-based resin (D) and 30 to 70 parts by weight of the acryl-based resin (E).

(A) Block Terpolymer of Aromatic Vinyl Compound and Alkene Compound

The terpolymer (A) used in the present invention is an A-B-A' type terpolymer. A and A' block are hard segments and B block is a soft segment. The hard segments prevent thermoplastic deformation, and the soft segment exhibits rubber characteristics. Various properties such as hardness, heat resistance, chemical resistance, wear resistance, etc. may be realized depending upon types, contents, molecular weights and arrangements of such hard segments and soft segment.

The terpolymer (A) may comprise 20 to 35% by weight of the hard segments and 65 to 80% by weight of the soft segment. Particularly, the amount of the hard segments may be 27 to 35% by weight and the amount of the soft segment may be 65 to 73% by weight.

As A and A' blocks, an aromatic vinyl-based polymer may be used. As a B block, a conjugated diene-based polymer may be used. Particularly, a styrene-based polymer may be used as A and A' blocks, and an ethylene-butadiene polymer, isoprene, an ethylene-isoprene polymer or an ethylene-propylene polymer may be used as the B block. More particularly, ethylene butadiene may be used as the B block.

Examples of the terpolymer (A) include a styrene-ethylene-butadiene-styrene (SEBS) block copolymer, a styrene-ethylene-propylene-styrene (SEPS) block copolymer, a styrene-isoprene-styrene (SIS) block copolymer, a styrene-ethylene-isoprene-styrene (SEIS) block copolymer, styrene-ethylene-ethylene-propylene-styrene (SEEPS) block copolymer and mixtures thereof, but the present invention is not limited thereto. Thereamong, particularly a styrene-ethylene-butadiene-styrene (SEBS) block copolymer, a styrene-ethylene-propylene-styrene (SEPS) block copolymer, a styrene-isoprene-styrene (SIS) block copolymer and a styrene-ethylene-isoprene-styrene (SEIS) block copolymer may be used.

The weight-average molecular weight of the terpolymer (A) may be 140,000 to 180,000 g/mol. Particularly, the weight-average molecular weight may be 147,000 to 170,000 g/mol. In this case, superior tensile strength is exhibited under low surface hardness.

(B) Paraffin Oil

The paraffin oil (B) used in the present invention functions as a softener of a thermoplastic rubber and is used to increase an elongation rate.

The average molecular weight of the paraffin oil (B) may be 400 to 1,200 g/mol, particularly 600 to 900 g/mol.

The kinematic viscosity of the paraffin oil (B) may be 95 to 215 cSt (at 40° C.), particularly 100 to 210.5 cSt (at 40° C.).

The paraffin oil (B) may have a specific gravity [15/4° C.] of 0.75 to 0.95, a flash point of 250 to 330° C. and a pour point of −25 to −5° C. Particularly, the paraffin oil (B) may have a specific gravity [15/4° C.] of 0.85 to 0.90, a flash point of 270 to 300° C. and a pour point of −18 to −9° C.

The paraffin oil (B) may be comprised in an amount of 50 to 100 parts by weight based on 100 parts by weight of the terpolymer (A). When the paraffin oil (B) is used within this range, extensibility, processability and superior property balance are provided.

Particularly, in the thermoplastic rubber composition, the content of the paraffin oil (B) may be higher than that of the terpolymer (A). In this case, low hardness and high extensibility are exhibited. Particularly, the terpolymer (A) and the paraffin oil (B) may be used in a ratio of 2:1 to 2:2. Within the range, the thermoplastic rubber composition according to the present invention has superior bonding strength to other thermoplastic resins. With increasing paraffin oil content, bonding strength is decreased. When the paraffin oil is not used, heat generation due to shear occurs upon extrusion processing, and there is limitation in manufacturing products having low hardness.

(C) Inorganic Additive

The inorganic additive (C) used in the present invention facilitates mixing of the terpolymer and the paraffin oil, and thus, processability of the thermoplastic rubber is increased.

As the inorganic additive (C), all types such as a particle type or a fiber type may be used. Particularly, a particle type may be used. When the particle type is used, a particle size is preferably 0.01 to 5 μm.

Examples of the inorganic additive (C) comprise calcium carbonate, talc, clay, silica, mica, titanium dioxide, carbon black, graphite, wollastonite, nano-silver, etc., but the present invention is not limited thereto. Such additives may be used alone or as a mixture of two or more thereof.

The inorganic additive (C) may be coated with a surface treatment agent such as a coupling agent or may be used as it is without coating treatment. Preferably, the inorganic additive (C) is added without coating treatment.

The inorganic additive (C) may be comprised in an amount of 30 to 70 parts by weight based on 100 parts by weight of the terpolymer (A). In this case, excellent mechanical properties and processability are exhibited, and superior property balance may be obtained.

(D) Polyolefin-Based Resin

The polyolefin-based resin (D) according to the present invention is used to increase mechanical properties of the thermoplastic rubber and processability upon injection-molding. The thermoplastic rubber may realize various characteristics depending upon the shape, molecular weight, density, a melt index and mechanical properties of the polyolefin-based resin.

As the polyolefin-based resin (D), a polypropylene resin or a polypropylene-ethylene copolymer resin may be used. Particularly, a polypropylene resin may be used. When the polypropylene resin is used, superior tensile strength is exhibited.

As the polyolefin-based resin (D), a polyolefin-based resin having a melt index of 20 to 40 g/10 min under conditions of 230° C. and 2.16 kg may be used. Particularly, the melt index may be 25 to 35 g/10 min.

The polyolefin-based resin (D) may have a density of 0.85 to 1.1 g/cm$^3$ and a tensile strength (yield point: 50 mm/min) of 300 to 380 kg/cm$^2$.

A structure of the polyolefin may be any one of an atactic structure, an isotactic structure and a syndiotactic structure.

Hardness is superior with increasing polyolefin-based resin (D) content, and hardness is decreased with increasing paraffin oil content. Accordingly, hardness may be freely controlled by controlling the contents of the polyolefin-based resin (D) and the paraffin oil (B). Particularly, the hardness (Shore A) of the thermoplastic rubber composition may be controlled to 30 to 80 A.

The polyolefin-based resin (D) may be comprised in an amount of 5 to 30 parts by weight based on 100 parts by weight of the terpolymer (A). When the polyolefin-based resin (D) is used within this range, excellent mechanical properties and processability are exhibited, and superior property balance may be obtained.

(E) Acryl-based Resin

The acryl-based resin (E) according to the present invention is used to enhance bonding strength of the thermoplastic rubber.

As the acryl-based resin (E), methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, allyl acrylate or ethylene methyl acrylate (EMA) may be used. Particularly, ethylene methyl acrylate (EMA) may be used.

The acryl-based resin (E) may be comprised in an amount of 30 to 70 parts by weight based on 100 parts by weight of the terpolymer (A). When the acryl-based resin is used within this range, superior bonding strength is exhibited.

The thermoplastic rubber composition according to the present invention may further comprise, other than the ingredient described above, general additives depending upon desired use. Examples of the additives include an antimicrobial agent, a thermal stabilizer, an antioxidant, a releasing agent, a light stabilizer, a surfactant, a coupling agent, a plasticizer, an admixture, a coloring agent, a stabilizer, a lubricant, an antistatic agent, a coloring agent, a flame retardant, an anti-weathering agent, a UV absorbent, a sunscreen, a flame retardant, a filler, a nucleating agent, an adhesion aid, an adhesive, etc. Such additives may be used alone or as a mixture of two or more thereof. Thereamong, as the antioxidant, a phenol-based, phosphite-based, thioether-based or amine-based antioxidant may be used.

A general additive may be used in an amount of 30 parts by weight or less based on 100 parts by weight of the thermoplastic rubber composition.

The thermoplastic rubber composition according to the present invention may be prepared according to publicly known methods used to prepare resin compositions. For example, the thermoplastic rubber composition may be pelletized by mixing the ingredients of (A), (B), (C), (D) and (E), and other additives at the same time and then melt-extruding the same in an extruder.

Molded Product Manufactured from Thermoplastic Rubber Composition

The thermoplastic rubber according to the present invention has a surface hardness (Shore A) of 30 to 80 A according to KS M 6518 and a tensile strength of 40 to 150 kgf/cm$^2$ according to KS M 6518. Accordingly, a molded product manufactured from the thermoplastic rubber composition according to the present invention may be used in a variety of applications.

The thermoplastic rubber composition according to the present invention may be molded into a certain shape according to publicly known various molding methods such as, for example, heat press molding, injection molding, extrusion molding and calendar molding.

Composite Thermoplastic Resin

The present invention provides a composite thermoplastic resin wherein the thermoplastic rubber composition is laminated on or bonded to a thermoplastic resin. Here, as the thermoplastic resin, a styrene-based resin, a polycarbonate-based resin, a polyolefin-based resin, or the like may be used.

Composite Thermoplastic Resin-molded Product

The composite thermoplastic resin-molded product according to the present invention comprises a thermoplastic resin layer and a thermoplastic rubber composition layer. The thermoplastic resin layer maintains rigidity of a molded product and forms a frame of a molded product.

The composite thermoplastic resin-molded product may be manufactured according to a method such as, for example, coextrusion molding, two-color molding, insert injection molding, double injection molding, etc.

Coextrusion molding is a molding method wherein two materials, i.e., a thermoplastic resin and the thermoplastic rubber composition according to the present invention are separately extruded in two extruders and are joined in a die so that the two materials are molded through heat-welding.

In addition, two-color molding is a molding method wherein two-layer molded products are molded by heat-welding two materials in a mold using an injection molding machine equipped with two injection buckets.

Double injection molding is a molding method wherein a molded product is manufactured by sequentially injection-molding two resin types in a mold.

Insert injection molding is a molding method wherein a two-layer molded product is manufactured by injecting a thermoplastic rubber composition into a mold into which a thermoplastic resin molded product molded using an injection machine is inserted and heat-welding the same.

Particularly, a molded product may be manufactured by double-injecting the thermoplastic rubber composition and a thermoplastic resin.

When double injecting, heat-welding or heat-bonding is carried out, bonding is performed without application of an adhesive and thus a bonding step may be omitted, thereby reducing manufacturing costs and simplifying a process. Such a molded product is used in bumpers and packaging for impact alleviation.

The composite thermoplastic resin-molded product according to the present invention has a bonding strength of 2 to 4 N/mm as measured using a UTM according to a KS M 6518 peeling test.

In addition, a rubber composition layer of the composite thermoplastic resin-molded product has a surface hardness (Shore A) of 30 to 80 A according to KS M 6518 and a tensile strength of 40 to 150 kgf/cm$^2$ according to KS M 6518.

Now, the present invention is described in more detail with reference to the following examples. These examples are provided only for illustration of the present invention and should not be construed as limiting the scope and spirit of the present invention.

MODE FOR INVENTION

Examples and Comparative Examples

Ingredients used in examples and comparative examples are as follows.

(A) Terpolymer

SEBS, G1651, available from Kraton, including 33% by weight of styrene (hard segment) and 67% by weight of ethylene butadiene (soft segment) and having a weight-average molecular weight of 150,000 g/mol was used.

(B) Paraffin oil

KL-900 available from SEOJIN CHEMICAL CO., LtD. was used.

(C) Inorganic Additive (C1) Calcium carbonate, KRISTON-SS, available from KRISRON was used.

(C2) Talc, UPN HS-T 0.5 m, available from HAYASHI KASEI Co., LtD. was used.

(D) Polyolefin-based Resin

Polypropylene, CB5230, available from Korea Petro-chemical Ind. Co., LtD. was used.

(E) Acryl-based Resin

Ethylene methyl acrylate, Elvaloy 1330 AC, available from DuPont was used.

In Comparative Example 1, Santoprene 8211-55B100 as TPV was used.

BRIEF DESCRIPTION OF DRAWING

FIG. 1: Tensile strength measured using a No. 3 type specimen of KS M 6518.

EXAMPLES 1 to 4 and COMPARATIVE EXAMPLES 1 to 6

Ingredients were mixed in a general mixer according to compositions (units: parts by weight) summarized in Table 1 below.

A mixed thermoplastic rubber composition was stirred at a rate of 600 rpm, 40° C. for 10 minutes in a Henschel mixer, and then prepared into a pellet phase using a twin-screw extruder in which L/D=36 and Φ=45 mm and using an underwater cutter at a fixed temperature of 250° C. and a screw rotation speed of 300 rpm. A prepared pellet was dried at 80° C. for two hours. Subsequently, a PC specimen previously prepared in a first circuit direction in a 10 ton injection machine was installed in a mold, and a specimen for property measurement was manufactured by injecting at an injection temperature of 200° C. Subsequently, properties of the specimen were measured and results thereof are summarized in Table 1 below.

TABLE 1

| | | Examples | | | | Comparative Examples | | | | | |
|---|---|---|---|---|---|---|---|---|---|---|---|
| | | 1 | 2 | 3 | 4 | 1 (TVC) | 2 | 3 | 4 | 5 | 6 |
| (A) | | 100 | 100 | 100 | 100 | | 100 | 100 | 100 | 100 | 100 |
| (B) | | 50 | 50 | 50 | 100 | | 60 | 90 | 90 | 100 | 100 |
| (C) | (C1) | — | — | 50 | 50 | | 50 | 30 | — | 30 | 30 |
| | (C2) | 30 | 30 | — | — | | — | — | 30 | — | — |

TABLE 1-continued

|   | Examples | | | | Comparative Examples | | | | | |
|---|---|---|---|---|---|---|---|---|---|---|
|   | 1 | 2 | 3 | 4 | 1 (TVC) | 2 | 3 | 4 | 5 | 6 |
| (D) | 10 | 10 | 5 | 30 | — | 10 | — | — | 30 | 40 |
| (E) | 40 | 60 | 30 | 60 | — | 10 | 30 | 30 | — | 10 |

Properties of manufactured specimens were measured according to methods below. Results are summarized in Table 2.

(1) Hardness: Shore A as surface hardness according to KS M 6518 was measured.

(2) Tensile strength: Measured using a No. 3 type specimen of KS M 6518 of FIG. 1.

(3) Bonding strength: Each of the thermoplastic rubber compositions summarized in Table 1 was injected into a mold into which a rectangular hard resin plate was inserted using an injection molding machine. As a result, a 2-layer composite plate including a hard resin layer (2 mm (thickness)×50 mm (width)×150 mm (length)) and a thermoplastic rubber composition layer (2 mm (thickness)×50 mm (width)×150 mm (length)) which were integrally adhered was manufactured. Subsequently, peel strength was measured, using a tension tester, when the thermoplastic rubber composition layer was peeled at 180° from the hard resin layer of the 2-layer composite plate.

TABLE 2

|   | Examples | | | | Comparative Examples | | | | | |
|---|---|---|---|---|---|---|---|---|---|---|
|   | 1 | 2 | 3 | 4 | 1 (TPV) | 2 | 3 | 4 | 5 | 6 |
| Hardness (Shore A) | 52.4 | 53.6 | 43.6 | 50.8 | 55.8 | 46.2 | 29.4 | 33.2 | 54.6 | 54.3 |
| Tensile strength (kgf/cm$^2$) | 59.8 | 68.3 | 42.1 | 46.9 | 55.1 | 38.6 | 26.8 | 26.8 | 49 | 63 |
| Bonding strength (PC, N/mm) | 3.49 | 3.71 | 2.31 | 2.03 | 2.43 | 0.51 | 2.34 | 2.83 | 0.15 | 0.88 |

As shown in Table 2, it can be confirmed that the thermoplastic rubber compositions according to Examples 1 to 4 have a hardness (Shore A) of 30 to 80 A and a tensile strength of 40 kgf/cm$^2$ or more, and thus, workability is not affected. In addition, it can be confirmed that the thermoplastic rubber compositions according to Examples 1 to 4 have excellent bonding strength, i.e., a bonding strength of 2 to 4 N/mm.

On the other hand, it can be confirmed that, in Comparative Example 2 in which the acryl-based resin (E) is not used, and Comparative Example 5 in which the acryl-based resin (E) is not used, bonding strength is decreased. In addition, it can be confirmed that, in Comparative Examples 3 and 4 in which the polyolefin D is not used, a bonding strength of 2 N/mm or more is exhibited, but hardness and tensile strength are decreased. Furthermore, it can be confirmed that, in Comparative Example 6 in which a large amount of the polyolefin D and a small amount of the acryl-based resin (E) are used, bonding strength is decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A thermoplastic rubber composition comprising, based on 100 parts by weight of a block terpolymer (A) of an aromatic vinyl compound and an alkene compound,
   50 to 100 parts by weight of a paraffin oil (B);
   30 to 70 parts by weight of an inorganic additive (C);
   5 to 30 parts by weight of a polyolefin-based resin (D); and
   30 to 70 parts by weight of an acryl-based resin (E).

2. The thermoplastic rubber composition according to claim 1, wherein the terpolymer (A) is an A-B-A' type, wherein A and A' blocks are hard segments and B block is a soft segment, wherein the terpolymer (A) comprises the hard segments in an amount of 20 to 35% by weight and the soft segment in an amount of 65 to 80% by weight.

3. The thermoplastic rubber composition according to claim 2, wherein A and A' blocks are aromatic vinyl-based polymers and B block is a conjugated diene-based polymer.

4. The thermoplastic rubber composition according to claim 1, wherein the terpolymer (A) is selected from the group consisting of a styrene-ethylene-butadiene-styrene (SEBS) block copolymer, a styrene-ethylene-propylene-styrene (SEPS) block copolymer, a styrene-isoprene-styrene (SIS) block copolymer, a styrene-ethylene-isoprene-styrene (SEIS) block copolymer, a styrene-ethylene-ethylene-propylene-styrene (SEEPS) block copolymer and mixtures of two or more thereof.

5. The thermoplastic rubber composition according to claim 1, wherein the terpolymer (A) has a weight-average molecular weight of 140,000 to 180,000 g/mol.

6. The thermoplastic rubber composition according to claim 1, wherein the paraffin oil (B) has a kinematic viscosity of 95 to 215 cSt (at 40° C.).

7. The thermoplastic rubber composition according to claim 1, wherein a ratio of the terpolymer (A) to the paraffin oil (B) is 2:1 to 2:2.

8. The thermoplastic rubber composition according to claim 1, wherein the inorganic additive (C) is selected from the group consisting of calcium carbonate, talc, clay, silica, mica, titanium dioxide, carbon black, graphite, wollastonite, nano-silver and mixtures thereof.

9. The thermoplastic rubber composition according to claim 1, wherein the polyolefin-based resin (D) has a melt index of 20 to 40 g/10 min under conditions of 230° C. and 2.16 kg.

10. The thermoplastic rubber composition according to claim 1, wherein the polyolefin-based resin (D) is a polypropylene resin or a polypropylene-ethylene copolymer resin.

11. The thermoplastic rubber composition according to claim 1, wherein the acryl-based resin (E) is selected from the group consisting of methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, allyl acrylate, ethylene methyl acrylate and mixtures thereof.

12. A molded product manufactured from the thermoplastic rubber composition according to claim 1.

13. A composite thermoplastic resin, comprising (a) at least one thermoplastic resin selected from the group consisting of a styrene-based resin, a polycarbonate-based resin and a polyolefin-based resin, and (b) the thermoplastic rubber composition according to claim 1 laminated on the thermoplastic resin (a).

14. A molded product manufactured from the composite thermoplastic resin according to claim 13.

15. The molded product according to claim 14, wherein the molded product has a bonding strength of 2 to 4 N/mm measured using a UTM according to a KS M 6518 peeling test.

16. The molded product according to claim 14, wherein the molded product has a surface hardness of 30 to 80 A according to KS M 6518 and a tensile strength of 40 to 150 kgf/cm$^2$ according to KS M 6518.

* * * * *